Patented May 8, 1923.

1,454,564

UNITED STATES PATENT OFFICE.

OTTO RUFF, OF BRESLAU, GERMANY.

PROCESS OF PRODUCING ZIRCONIUM DIOXIDE.

No Drawing.  Application filed November 18, 1922. Serial No. 601,879.

*To all whom it may concern:*

Be it known that I, OTTO RUFF, citizen of the German Republic, residing at Uferzeile 10, Breslau 16, Germany, have invented a new and Improved Process of Producing Zirconium Dioxide, of which the following is a specification.

Heretofore zirconium oxid has been produced from ores thereof, for instance baddeleyite, either by first heating the ore with concentrated $H_2SO_4$ or HF, or by fusion with alkali (e. g., $Na_2CO_3$). The present invention comprises an improvement in the latter mode of operation.

In the previous processes, the ore was mixed with 6 to 10 times its own weight of alkali. This resulted in the particles of the zirconiferous ore becoming coated with alkali-rich zirconate, which layer was not readily soluble in the melt, so that after the process, large percentages, in some cases up to 60%, of the total zirconium present in the ore would remain undissolved in the final acid treatment. (In my process I use much less alkali than above stated, as will appear below).

I have now found that by reducing the amount of alkali (alkali metal carbonate) used in the first step, a far better yield is obtained in the final step. Thus with baddeleyite, it is convenient to use alkali metal carbonate (say $Na_2CO_3$) equal to 0.7 to 1.5 times the quantity of ore, whereby for each molecule of $ZrO_2$ about 0.75 to 2 molecles of $Na_2CO_3$ is present, and for each molecule of $Al_2O_3$ or $SiO_2$ or like oxids, about 1 to 1.5 molecules of $Na_2CO_3$ is present. With these amounts used in the first step, the later strong acid treatment will dissolve proportions of the zirconium, corresponding to good yields.

In common methods, after the fusion operation, the ore is treated with water to dissolve out the soluble compounds, while steam is bubbled through this water. This is referred to as the "bubbling." During this treatment any excess of alkali present in the frit, also aluminates and silicates dissolve out, leaving the insoluble compounds of zirconium (perhaps $ZrNa_2O_3$), insoluble compounds of titanium (perhaps $TiNa_2O_3$), insoluble compounds of iron, and perhaps other insoluble compounds. In the old processes, this action has been quite slow, and I have found that it can be very greatly accelerated by conducting this operation under superatmospheric pressure, and at temperatures above 100°C. In this way the leaching out of the soluble by-products can be completed in a much shorter time than by the prior methods.

The insoluble residue from the hot water treatment is then, as in the prior art, treated with acids to dissolve the zirconium compounds. In this step also, the use of the pressures above atmospheric is a distinct advantage as accelerating the solution of the zirconium content. Sulfuric acid is preferably used in this step.

If the ore treated contains much titanium, this can be largely gotten into the insoluble residue, of the acid treatment, by making the concentration of the acid, in the final step, so small that the titanium oxid is not dissolved thereby, or if initially dissolved, it will be reprecipitated.

The solution from the acid treatment will contain the soluble zirconium compounds (say sulfate). From this solution the zirconium hydroxid can be precipitated by sodium carbonate, or zirconium oxychlorid can be formed by treatment with strong HCl. In either case there may be some aluminum, titanium and iron compounds present as impurities. The iron can be removed by dissolving the impure zirconium hydroxid in strong HCl, then oxidizing the iron present to ferric chlorid, and washing out the latter with ether.

The following example is given, for illustrative purposes, showing the production of pure $ZrO_2$ from a crude zirconium ore containing titanium.

The ore is mixed with $Na_2CO_3$ in the calculated proportions to form $Na_2ZrO_3$, $Na_2SiO_3$, $Na_2TiO_3$, $NaFeO_2$, etc. The mixture is heated to 1200 to 1400° C., for two hours. The frit is then powdered, and is treated with water, under pressure, at 125 to 135°C., to dissolve out soluble compounds. The insoluble residue is then heated twice with sulfuric acid in an autoclave, to about 125 to 135° C., each heating being continued about six hours. The amount of sulfuric acid should be slightly in excess of the amount necessary to theoretically react to form zirconium sulfate. The solution, after filtration to remove insoluble matter, is treated with sodium carbonate to precipitate zirconium hydroxid. The precipitate is filtered, washed well with hot water, then heated with as much concentrated HCl as is necessary to dissolve it. Then oxidize the solution with chlorin or nitric acid, extract the solution with ether until free from iron. Drive off the remaining ether from the solution. The latter contains chlorid and oxychlorid, the latter being a precipitate is separated by filtration. The solution of the chlorid is then evaporated to crystallization, and any oxychlorid separated during this step can be separated by filtration.

The oxychlorid can be converted into oxid by simple heat treatment.

I claim:

1. A process of treating zirconium ores, which comprises strongly heating the ore with a carbonate of an alkali metal, the mixture containing for each molecular equivalent of zirconium oxid about .75 to 2 molecular equivalents of said carbonate, and for each molecular equivalent of alumina and silica, about 1 to 1.5 molecular equivalents of said carbonate, and thereafter dissolving the water-insoluble zirconium compounds in an acid.

2. In the process of claim 1, the step of heating the mixture to about 1200 to 1400° C., for about 2 hours.

In testimony whereof I affix my signature in presence of two witnesses.

Dr. OTTO RUFF.

Witnesses:
 Oscar F. Bram,
 Ernst Katz.